US008487489B2

(12) United States Patent
Palafox et al.

(10) Patent No.: US 8,487,489 B2
(45) Date of Patent: Jul. 16, 2013

(54) APPARATUS FOR COOLING AN ELECTRIC MACHINE

(75) Inventors: Pepe Palafox, Albany, NY (US); William Dwight Gerstler, Niskayuna, NY (US); Xiaochun Shen, Cohoes, NY (US); Ayman Mohamed Fawzi El-Refaie, Niskayuna, NY (US); Murtuza Lokhandwalla, Clifton Park, NY (US); Lembit Salasoo, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 291 days.

(21) Appl. No.: 12/847,725

(22) Filed: Jul. 30, 2010

(65) Prior Publication Data

US 2012/0025638 A1    Feb. 2, 2012

(51) Int. Cl.
*H02K 9/00* (2006.01)

(52) U.S. Cl.
USPC ........................................... 310/52

(58) Field of Classification Search
USPC ............................. 310/52, 54, 57, 58, 62, 64
See application file for complete search history.

(56) References Cited

U.S. PATENT DOCUMENTS

| 5,670,838 | A  | * | 9/1997  | Everton     | 310/216.061 |
|-----------|----|---|---------|-------------|-------------|
| 6,639,334 | B2 |   | 10/2003 | Chen et al. |             |
| 7,009,317 | B2 | * | 3/2006  | Cronin et al. | 310/54    |
| 7,160,086 | B2 |   | 1/2007  | Maceyka et al. |          |
| 2006/0043801 | A1 | * | 3/2006 | Adra      | 310/54      |
| 2009/0015081 | A1 | * | 1/2009 | Takenaka et al. | 310/54 |

* cited by examiner

*Primary Examiner* — Nguyen N Hanh
(74) *Attorney, Agent, or Firm* — Ann M. Agosti

(57) ABSTRACT

Provided is an apparatus, for example, for use with a rotating electric machine, that includes a housing. The housing can include a housing main portion and a housing end portion. The housing main portion can be configured to be disposed proximal to a body portion of a stator section of an electric machine. The housing main portion can define a main fluid channel that is configured to conduct fluid therethrough. The housing end portion can receive fluid from said main fluid channel and direct fluid into contact with a winding end portion of a conductive winding of the stator section.

17 Claims, 14 Drawing Sheets

_US 8,487,489 B2_

APPARATUS FOR COOLING AN ELECTRIC MACHINE

STATEMENT REGARDING FEDERALLY SPONSORED RESEARCH & DEVELOPMENT

This invention was made with Government support under contract number DE-FC26-07-NT43122 awarded by the Department of Energy. The Government has certain rights in the invention.

BACKGROUND

Embodiments presented herein generally relate to electric machines, and more particularly to apparatuses for cooling electric machines.

Rotating electric machines, such as generators and motors, conventionally employ a rotor section, which rotates and includes one or more (electro- or permanent) magnet assemblies, and a stator section, which often surrounds the rotor section and includes a series of conductive windings. Depending on whether the electric machine is a generator or a motor, electric current in the conductive windings will either be induced by or cause rotation of the rotor section. In either case, due to the current in the stator windings and the resistance thereof, thermal energy will be produced, with the amount of thermal energy generated in the stator section being roughly proportional to the amount of power an electric machine generates (for generator application) or delivers (for power motor application). For high power density rotating electric machines, if the thermal energy is not sufficiently removed, the temperature in the stator section can exceed the material limits electrical insulation and/or other materials within the stator section.

In advanced electric machine applications, the demand for power has been constantly increasing while the desirable machine size has been constantly decreasing. An electrical machine that meets these two conditions generally has high power density and very demanding cooling requirements.

BRIEF DESCRIPTION

In one aspect, an apparatus, for example, for use with a rotating electric machine, is provided. The apparatus may include a housing, which housing can include a housing main portion and a housing end portion. The housing main portion can be configured to be disposed proximal to a body portion of a stator section of an electric machine. For example, the housing main portion may fit around and radially exterior to the stator section. The housing main portion can define a main fluid channel that is configured to conduct fluid therethrough. The main fluid channel may include a network of fluid paths. For example, the main fluid channel can include an inlet manifold and an outlet manifold connected together by at least two parallel fluid paths that respectively extend along opposing sides of the housing main portion.

The housing end portion can receive fluid from said main fluid channel and direct fluid into contact with a winding end portion of a conductive winding of the stator section. For example, the housing end portion may be configured to enclose the winding end portion of the conductive winding. The housing end portion can define an end fluid channel that is in fluid communication with the main fluid channel. The end fluid channel may define a port, with the housing end portion further defining a barrier structure configured to inhibit liquid movement from an area inside the housing end portion to an area outside the housing end portion. The barrier structure may be configured to be disposed in close proximity to the body portion of the stator section.

In some embodiments, the housing main portion and the housing end portion may be configured to conduct fluid therethrough while maintaining separation between the fluid and a bore defined by the stator section. The barrier structure can be disposed in close proximity to the body portion and/or sealed to the body portion.

In another aspect, an apparatus, such as a rotating electric machine, is provided. The apparatus may include a rotor section and a stator section disposed proximal to the rotor section. The stator section may include a body portion and a conductive winding coupled to the body portion and having a winding end portion. The apparatus may also include a housing having a housing main portion and a housing end portion. The housing main portion can be disposed proximal to the body portion, and can define a main fluid channel that is configured to conduct fluid therethrough. The housing end portion can receive fluid from the main fluid channel and direct fluid into contact with the winding end portion. The winding end portion can extend beyond the body portion, and the housing end portion can be configured to enclose the winding end portion.

In one embodiment, the stator section may be substantially annular and may define a bore. The rotor section may be disposed within the bore, and the housing main portion and the housing end portion can be configured to conduct fluid therethrough while maintaining separation between the fluid and the bore.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
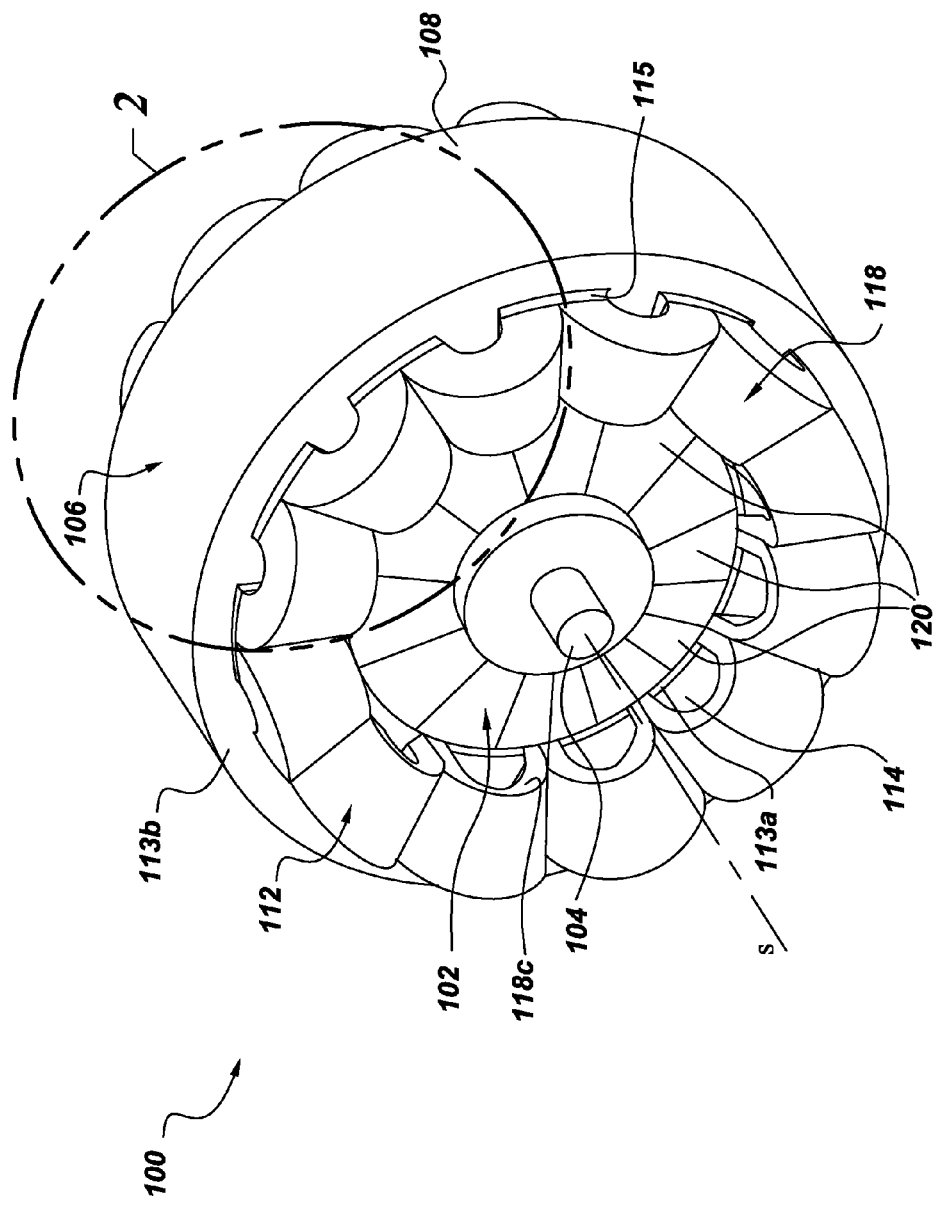
FIG. 1 is a perspective view of a portion of an electric machine configured in accordance with an example embodiment.

Example embodiments are described below in detail with reference to the accompanying drawings, where the same reference numerals denote the same parts throughout the drawings. Some of these embodiments may address the above and other needs.

Figure 2:
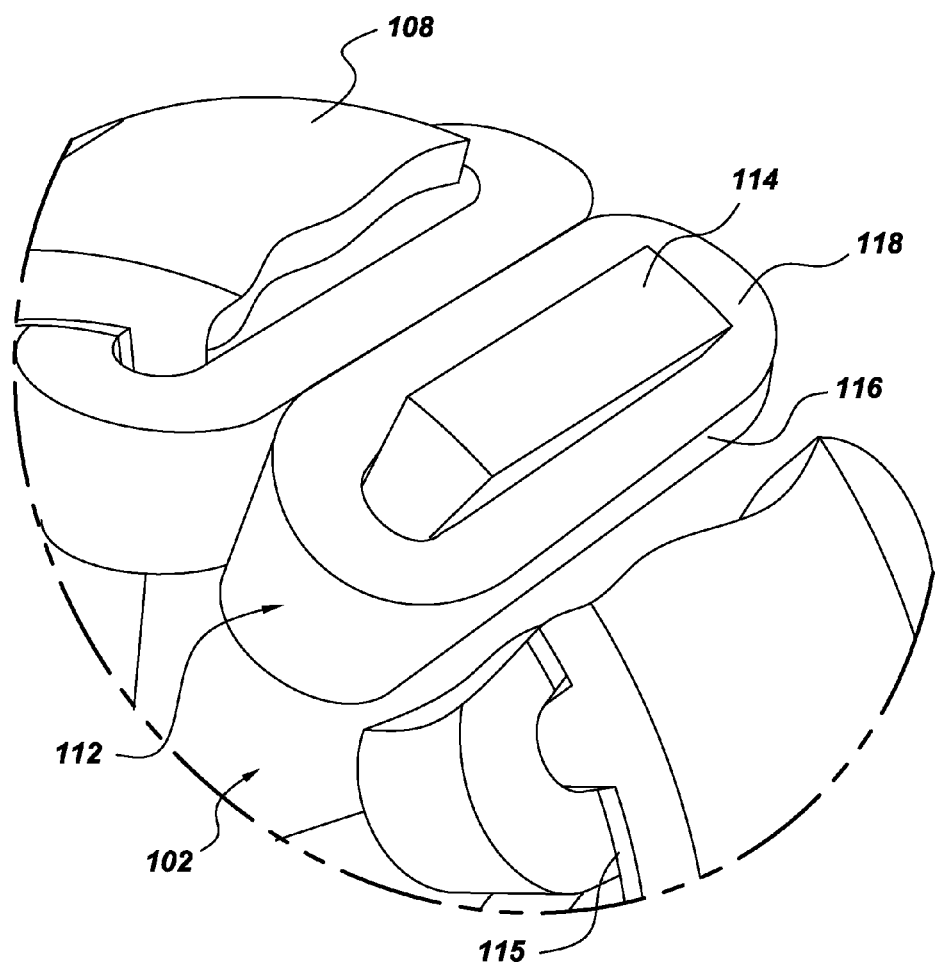
FIG. 2 is a perspective, magnified view of the area 2 of FIG. 1.
Figure 3:
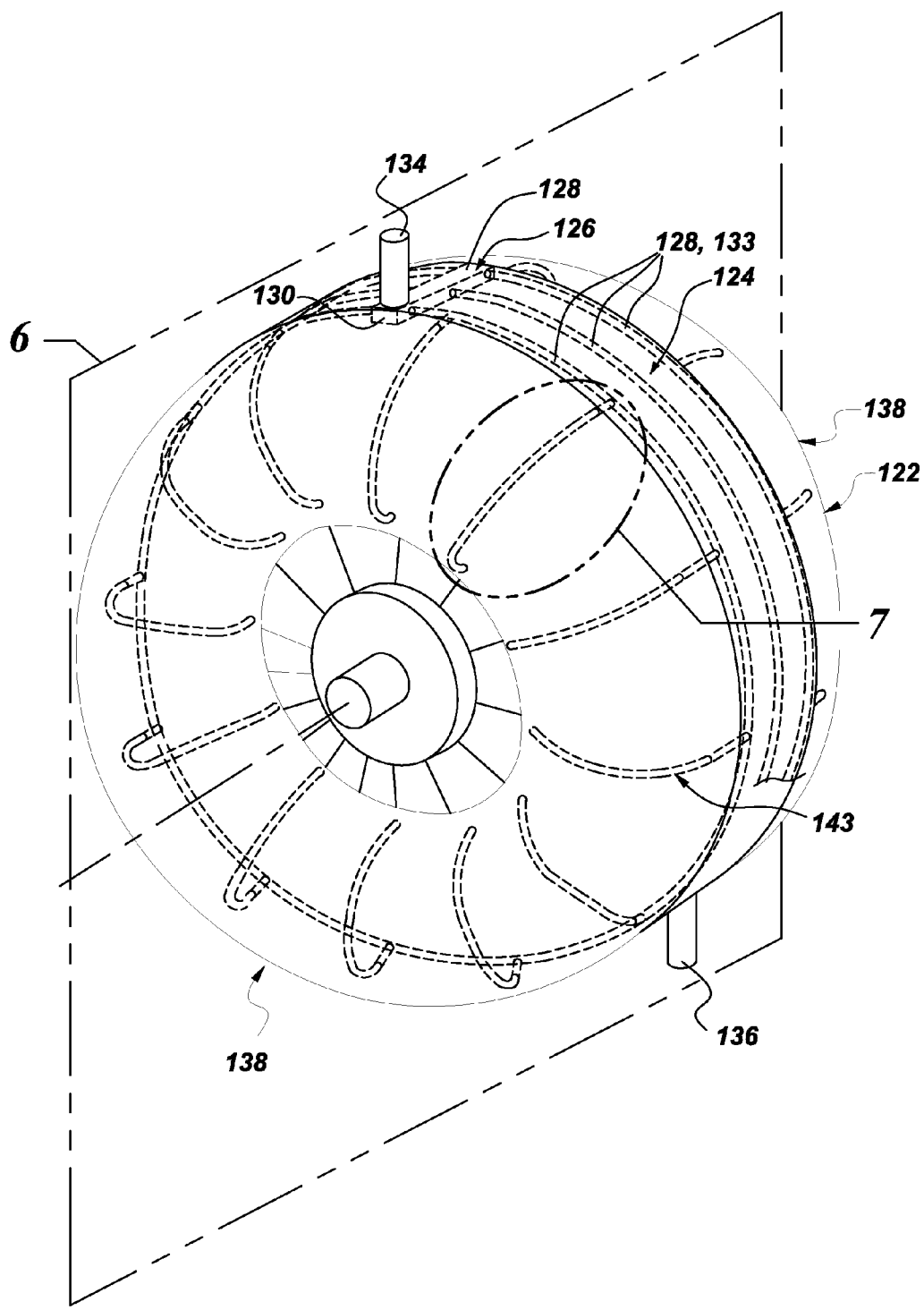
FIG. 3 is a perspective view of the portion of the electric machine of FIG. 1 including the housing.
Figure 4:
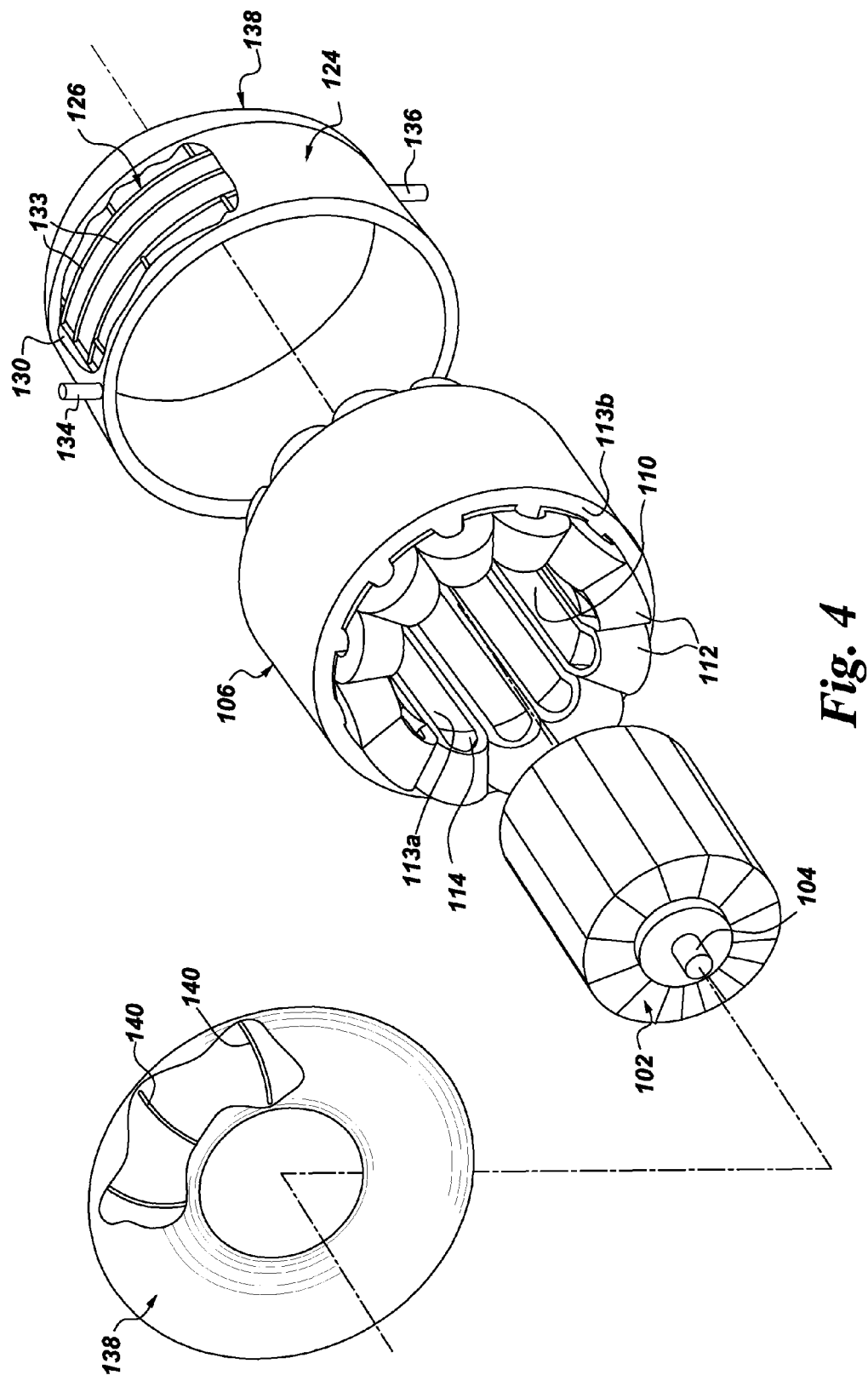
FIG. 4 is a perspective, exploded, fragmentary view of the electric machine of FIG. 3.
Figure 5:
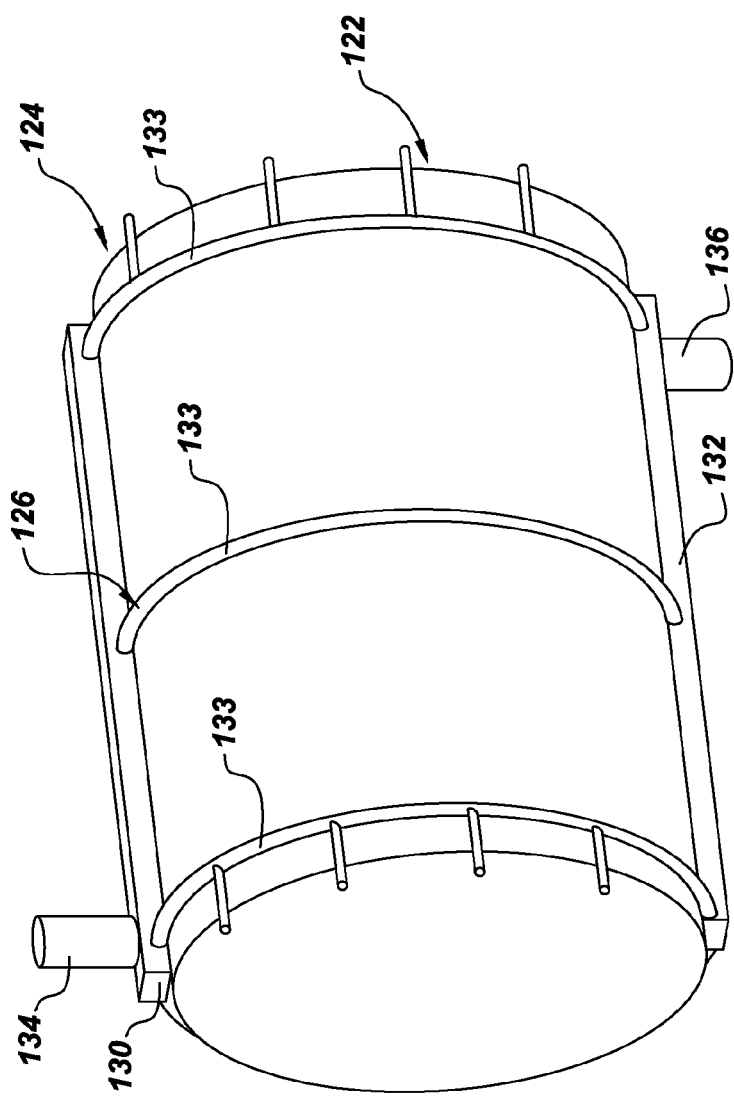
FIG. 5 is a fragmentary perspective view of the housing of FIG. 3.
Figure 6:
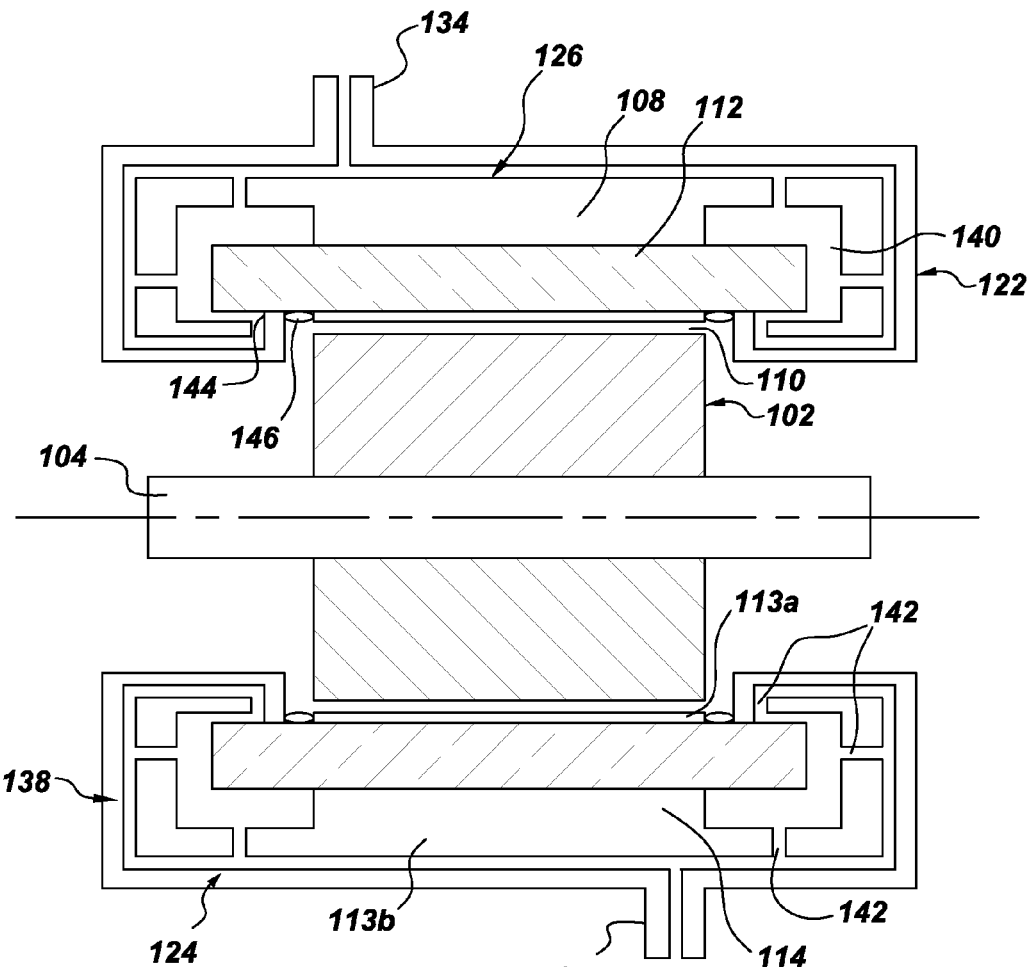
FIG. 6 is a cross sectional view of the electric machine of FIG. 3 taken along plane 6 of FIG. 3.
Figure 7:
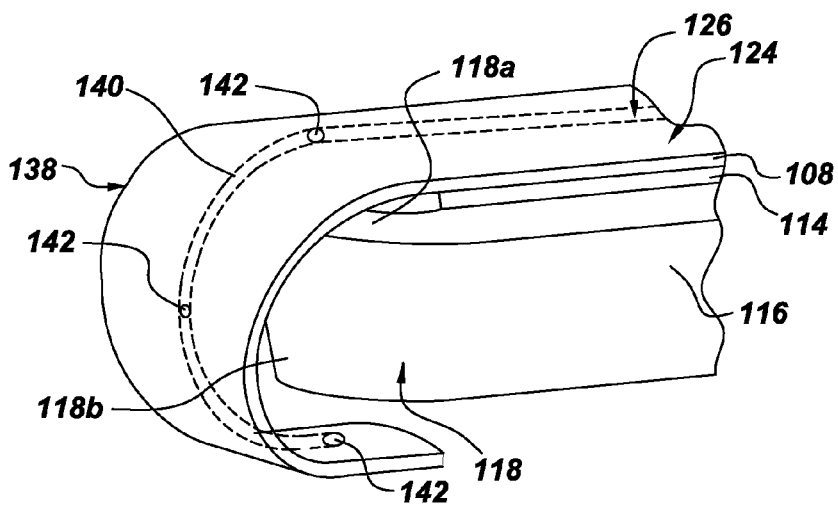
FIG. 7 is a perspective, magnified view, partially fragmented, of the area 7 of FIG. 3.
Figure 8:
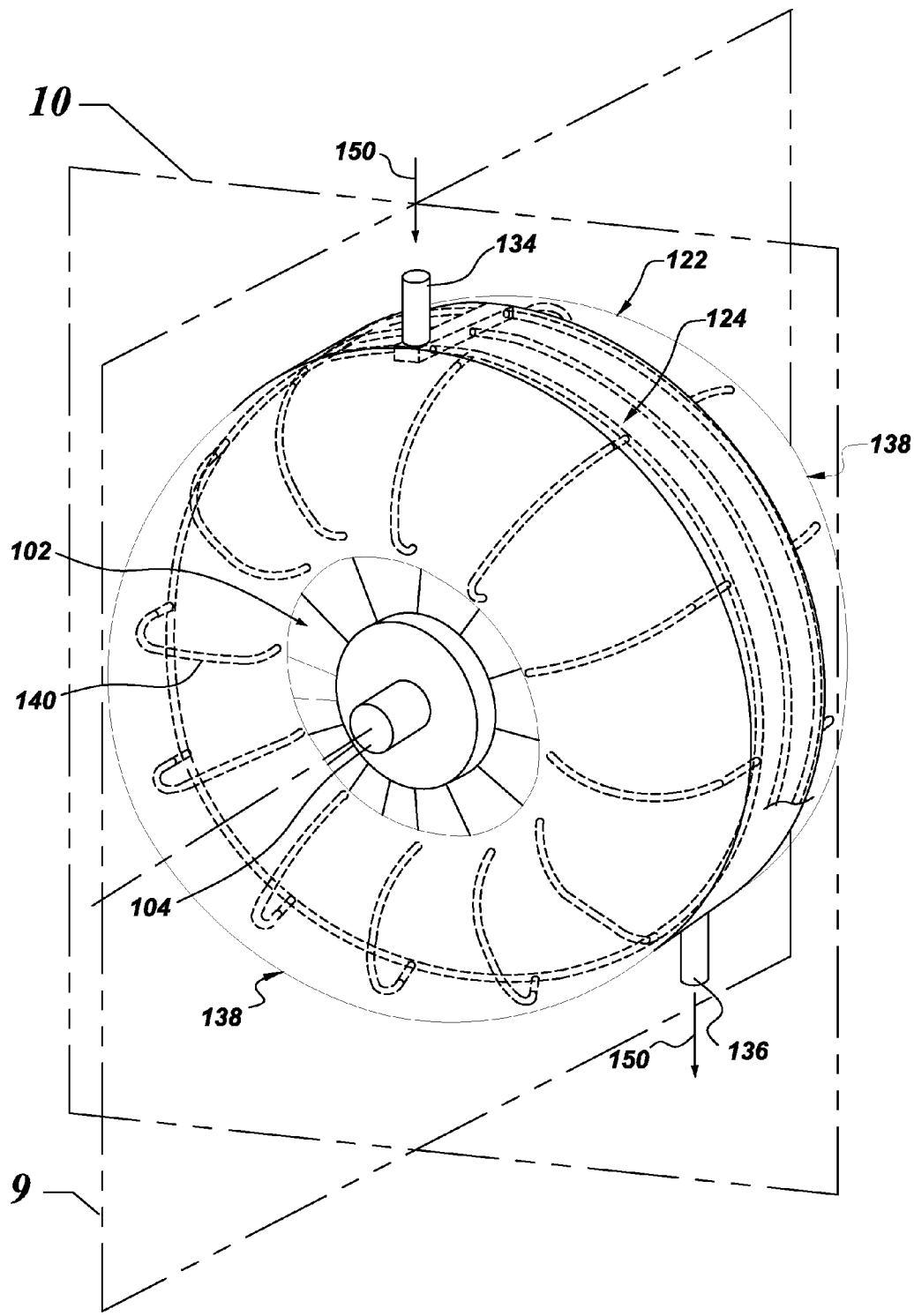
FIG. 8 is a perspective view of the electric machine of FIG. 3 showing fluid circulating therethrough.
Figure 9:
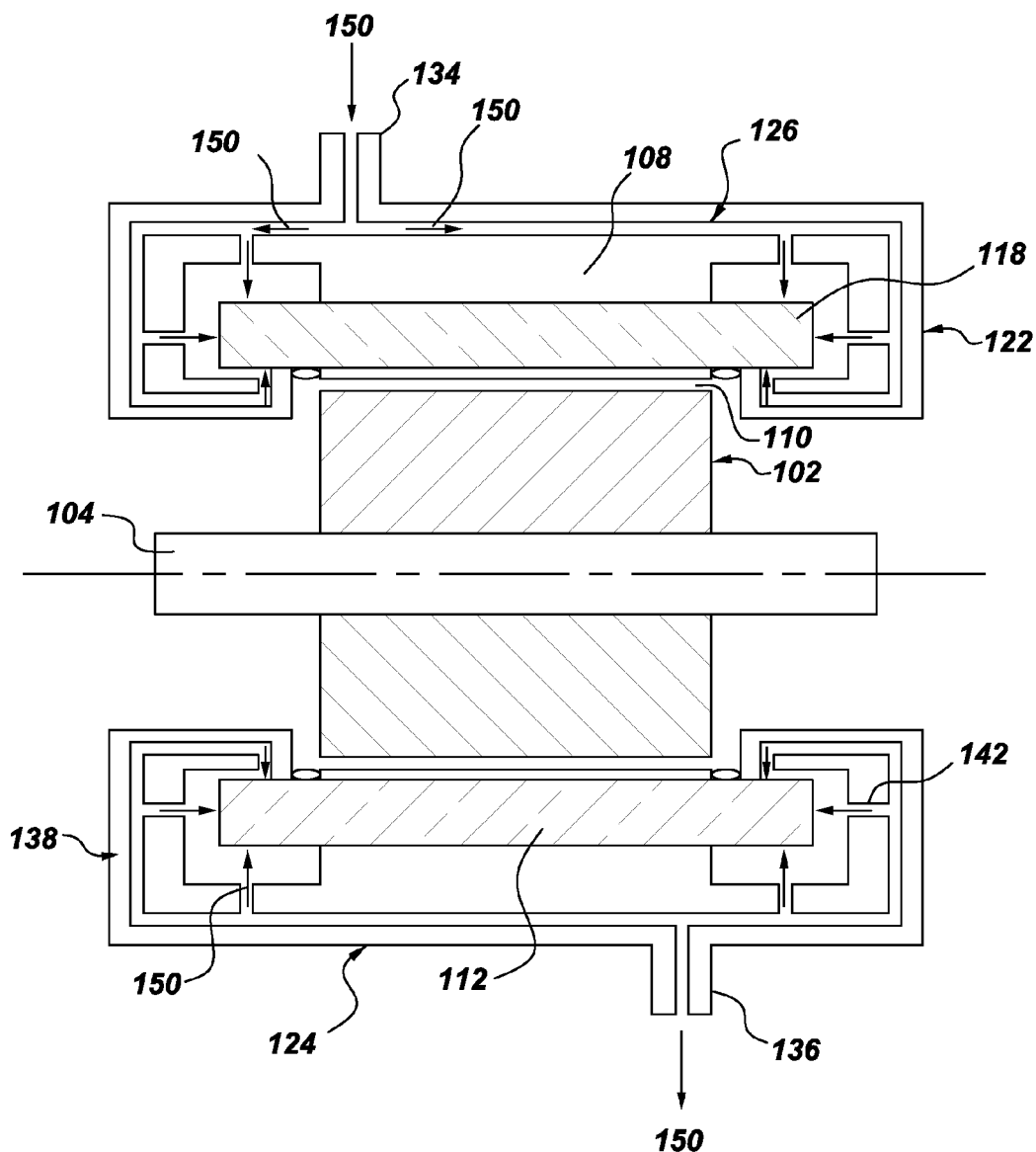
FIG. 9 is a cross sectional view of the electric machine of FIG. 8 taken along plane 9 of FIG. 8.
Figure 10:
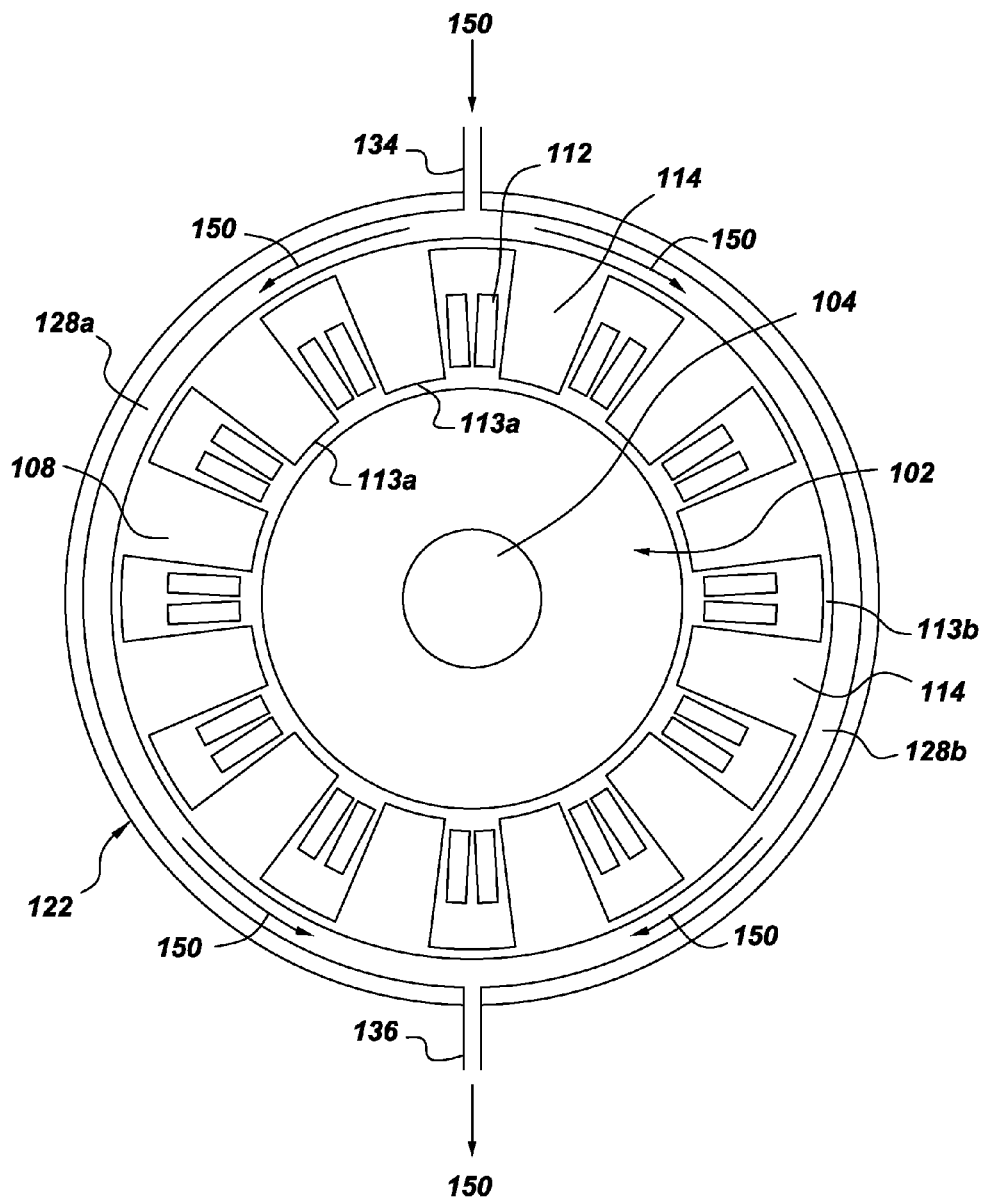
FIG. 10 is a cross sectional view of the electric machine of FIG. 8 taken along plane 10 of FIG. 8.
Figure 11:
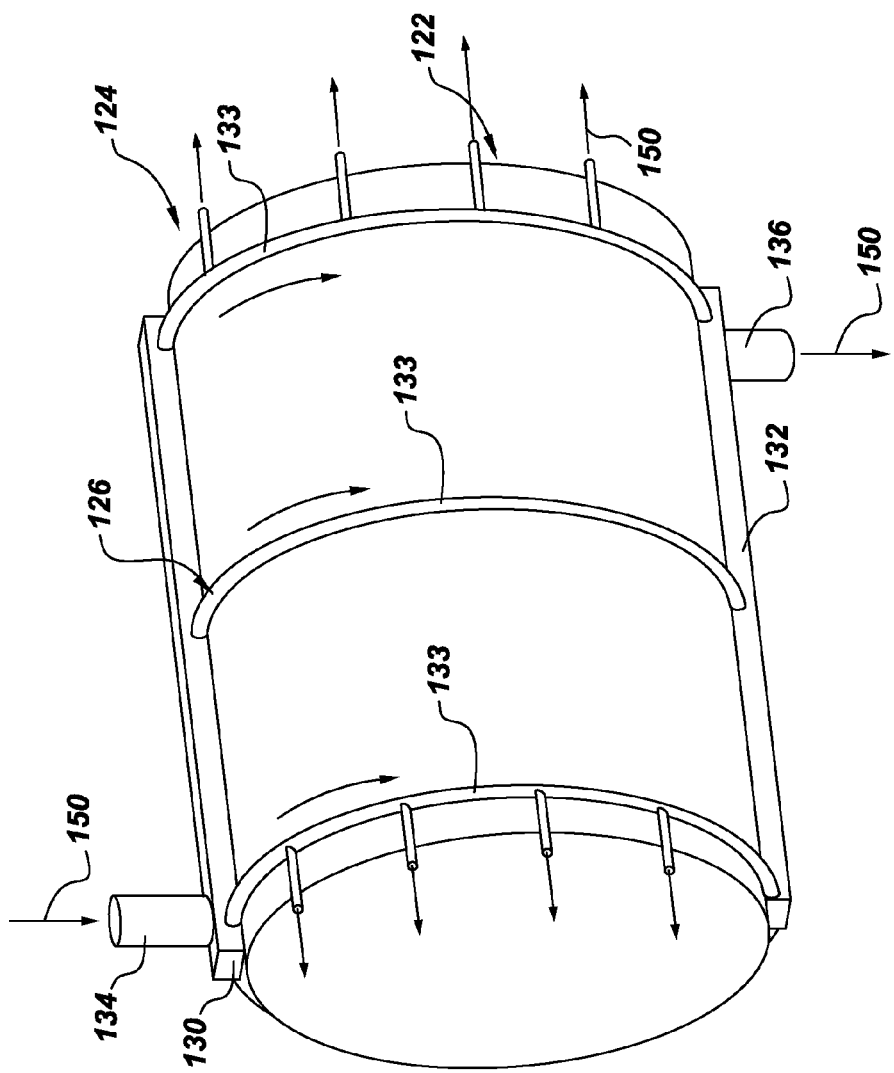
FIG. 11 is a perspective, fragmentary view of the housing of FIG. 8.
Figure 12:
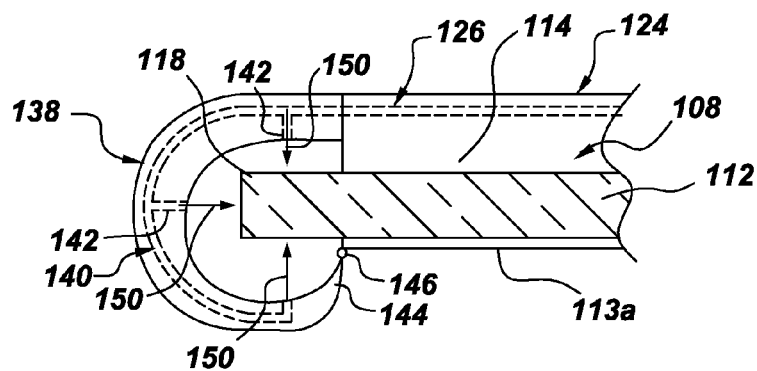
FIG. 12 is a magnified, cross sectional view of the electric machine of FIG. 8 showing the housing end portion.
Figure 13:
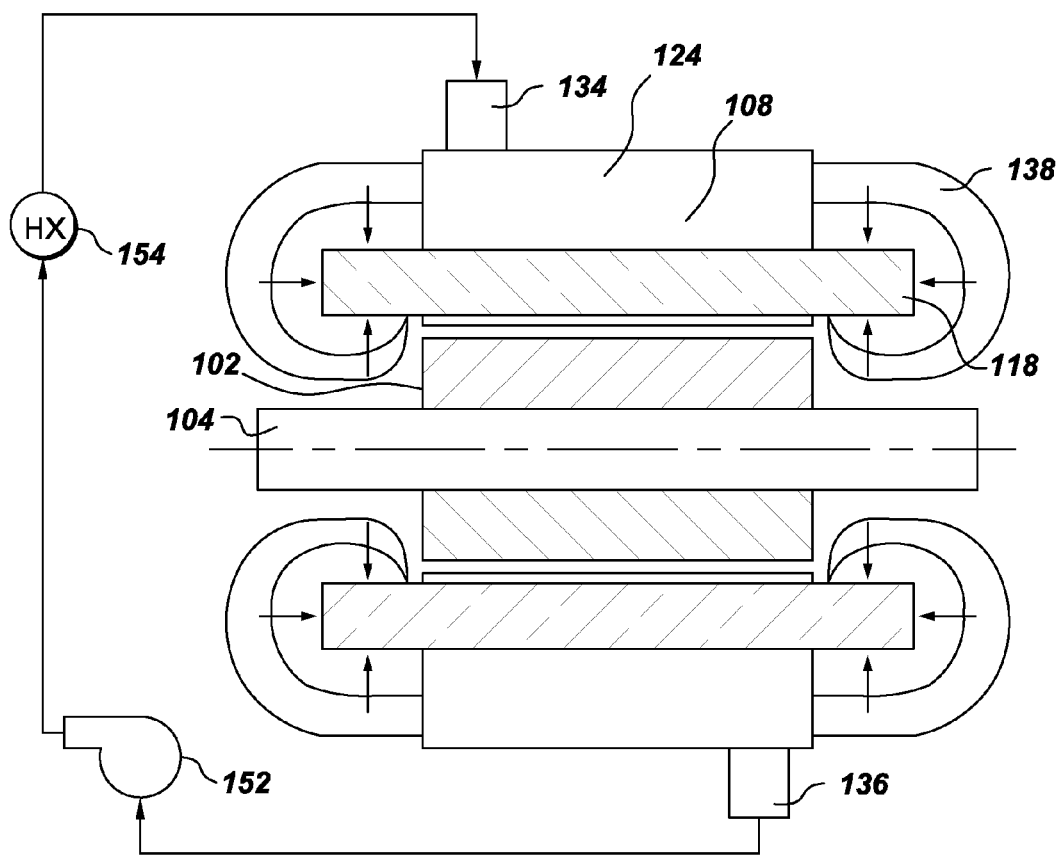
FIG. 13 is cross sectional view of the electric machine of FIG. 8.

Referring to FIGS. 1 and 2, therein are shown views of a portion of a rotating electric machine 100, such as an electric motor or generator. The electric machine 100 can include a rotor section 102 that is coupled to a shaft 104 that rotates about a shaft axis s. A stator section 106 can be disposed proximal to the rotor section 102. For example, the stator section may include a body portion 108 that is substantially annular so as to define a bore 110 (FIG. 4), and the rotor section may be disposed within the bore.

One or more conductive windings 112 can be coupled to the body portion 108. For example, the body portion 108 may include an outer casing 113b (sometimes referred to as the "back iron" or "yoke"), and one or more teeth 114 each extending radially inward from the outer casing to a tooth tip 113a, and the conductive windings 112 can be wound around respective teeth. Insulation 115 can be included between the body portion 108 and teeth 114 so as to prevent unintended currents therebetween. Each of the windings 112 may include a winding axial portion 116 that extends along the body portion 108 and a winding end portion 118 that extends beyond the body portion. The rotor section 102 may include one or more magnets 120. The magnets 120 can be electromagnets and/or permanent magnets.

Referring to FIGS. 1-7, the electric machine 100 can include a housing 122. The housing 122 can have a housing main portion 124 that is configured to be disposed proximal to the body portion 108 of the stator section 106. For example, the housing main portion 124 can fit around and radially exterior to the stator section 106, such that the housing main portion encircles the stator section.

The housing main portion 124 can define a main fluid channel 126 that is configured to conduct fluid therethrough. The main fluid channel 126 can include a network of fluid paths 128. For example, the main fluid channel 126 can include an inlet manifold 130 and an outlet manifold 132 connected together by multiple parallel branches 133. The manifolds 130, 132 can extend, say, axially along the housing main portion 124 to distribute and collect fluid, while the branches 133 can extend circumferentially along the housing main portion so as to connect the manifolds. A fluid inlet 134 can connect to the inlet manifold 130 and a fluid outlet 136 can connect to the outlet manifold 132. In some embodiments, the manifolds 130, 132 may be tapered to enhance the level of uniformity of fluid flow amongst the branches 133.

A housing end portion 138 can be configured so as to receive fluid from the main fluid channel 126 and to direct the fluid into contact with at least one of the winding end portions 118. For example, the housing end portion 138 can be configured to enclose the winding end portions 118, and can define one or more end fluid channels 140 that are in fluid communication with the main fluid channel 126. The end fluid channels 140 can be disposed so as to correspond to respective winding end portions 118. Each end fluid channel 140 can define one or more ports 142 that are configured to direct fluid emanating therefrom toward the corresponding winding end portions 118, as is discussed in more detail below. In one embodiment, three ports 142 can be distributed at three locations along each end fluid channel 140, the three ports being configured so as to direct fluid into contact with a top 118a, front 118b, and bottom surface 118c of the associated winding end portion 118. In other embodiments, the locations and geometries of the ports 142 can be varied as needed. For example, while the ports 142 are generally represented in the figures as simple apertures, in some embodiments, the ports may include or define spray nozzles that serve to shape the flow of liquid into jets, cones, mists, etc. The main fluid channel 126 and the end fluid channels 140 are together referred to as the fluid network 143.

The housing end portion 138 can also define a barrier structure 144 configured to inhibit liquid movement out from the housing end portion. The barrier structure 144 can act to contain liquid emanating from the ports 142. The barrier structure 144 can be configured to be disposed in close proximity to the body portion 108 of the stator section 106 (e.g., close to the inner casing 113a), such that there is very little clearance between the barrier structure and the body portion. In some embodiments, the barrier structure 144 may seal to the body portion 108, for example, through epoxy 146 or a gasket. Overall, the housing main portion 124 and the housing end portion 138 can be configured to conduct fluid therethrough (e.g., through the main fluid channel 126 and the end fluid channels 140) while maintaining separation between the fluid and a bore 110 defined by the stator section 106.

It is noted that, while the housing 122 has been described above as being distinct from the body portion 108 of the stator section 106, in other embodiments, the housing may replace or be integrated with the body portion. For example, the outer casing 113b of the body portion 108 may define therein the main fluid channel 126, thereby serving the function of the housing 122.

During operation of the electric machine 100, the shaft 104 rotates, as does the rotor section 102 and magnets 120. Depending on whether the electric machine 100 is a generator or a motor, electric current in the conductive windings 112 will either be induced by or cause rotation of the rotor section 102. In either case, due to resistive losses, the current in the windings 112 causes a production of thermal energy. As discussed below, a fluid can be passed through the housing 122 in order to transfer thermal energy away from the windings 112.

Referring to FIGS. 8-13, a fluid 150 can be introduced into and conducted through the housing main portion 124 and the housing end portion 138. For example, in one embodiment, fluid 150 can enter the main fluid channel 126 via the fluid inlet 134. The main fluid channel 126 can include an inlet manifold 130 to which are connected various fluid paths 128. The inlet manifold 130 can serve to distribute the fluid 150 to the fluid paths 128, and the fluid paths can in turn act to generally distribute the fluid across the surface of the main housing portion 124 and body portion 108. The fluid paths 128 can be arranged such that corresponding pairs (e.g., paths 128a and 128b in FIG. 10) extend along opposing sides of the housing 124. The end fluid channels 140 can fluidly communicate with the main fluid channel 126 (e.g., with one of the fluid paths 128).

The fluid 150 will be referred to as a "cooling fluid," but it should be understood that the housing 122 could be used to provide heating or cooling depending on the temperature and composition of the fluid. Further, it is to be understood that the fluid 150 can be a mixture of several materials, and may include solids (e.g., as a suspension), liquids, and/or gases. In some embodiments, a non-electrically conductive cooling fluid 150, such as oil, may be utilised. This may facilitate cooling of uninsulated windings 112 and/or winding end portions 118.

For the embodiment depicted in FIGS. 8-13, cooling fluid 150 can follow one of two paths as it traverses the fluid network 143. Some cooling fluid 150 will enter the fluid network, via the fluid inlet 134, at the inlet manifold 130, and will pass through a fluid path 128 to the outlet manifold 132 to exit the network via the fluid outlet 136. Other cooling fluid 150 will enter the fluid network at the fluid inlet 134 and inlet manifold 130, and will pass through a fluid path 128 before reaching an end fluid channel 140, thereafter being expelled from a port 142 into the housing end portion 138. The housing end portion 138 can be concave in shape in order to contain the cooling fluid 150, with the barrier structure 144 preventing the flow of fluid into the bore 110 of the stator section 106. Cooling fluid 150 can then flow along the housing end portion 138, which can be coupled to the outlet manifold 132 to allow the cooling fluid to exit the network 143 via the fluid outlet.

A pump 152 can act to urge the cooling fluid 150 exiting the fluid network 143 at the fluid outlet 136 back to the fluid inlet 134. A heat exchanger 154 or some other type of heat transfer system can be included so as to remove thermal energy from the cooling fluid 150 before the cooling fluid re-enters the fluid network 143 at the fluid inlet 134.

As mentioned above, the housing main portion 124 and the housing end portion 138 can be configured to conduct the cooling fluid 150 while maintaining separation between the cooling fluid and the bore 110 defined by the stator section 106. By avoiding the introduction of the cooling fluid 150 into the bore 110 (and, therefore, also avoiding contact between the cooling fluid and the rotor section 102 and the shaft 104), the churning loss associated with the spinning of the rotor section may be reduced.

Embodiments consistent with the above description may lend themselves to being manufactured through relatively simple processes. For example, in some embodiments, the housing 122, including the end portion 138 and the housing main portion 124, may be cast all at once. Where the housing 122 is integrated with the body portion 108 of the stator section 106, this casting may not require any additional steps in the manufacturing process of the electric machine 100. The ports 142 can be formed through casting as well, or can be drilled subsequent to forming the housing end portion 138.

Figure 14:
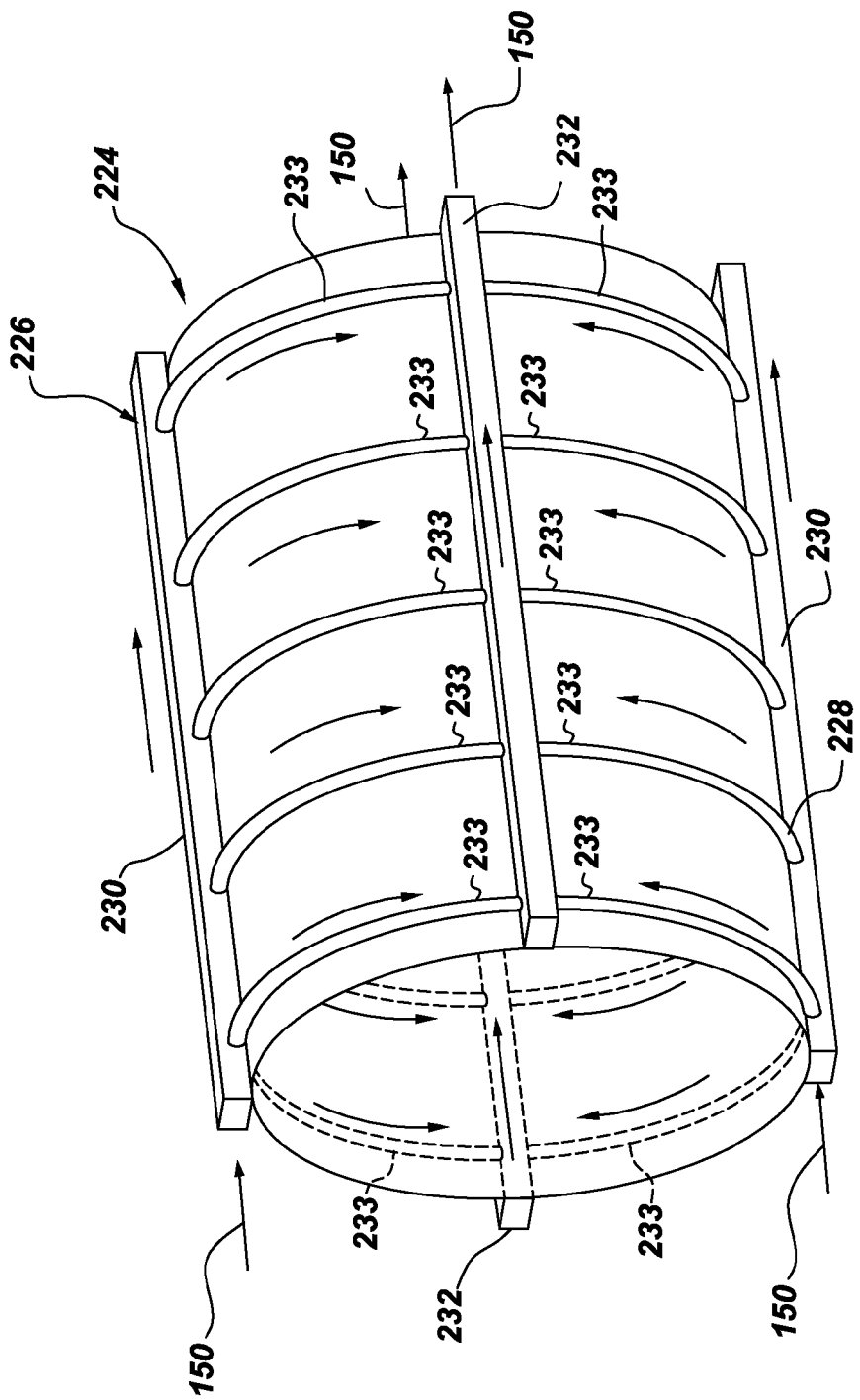
FIG. 14 is a perspective, fragmentary view of a housing main portion configured in accordance with another example embodiment.

Other arrangements of the fluid network 143 (FIG. 3) are also possible. For example, referring to FIG. 14, a housing main portion 224 can define a main fluid channel 226 that includes multiple inlet manifolds 230, as well as multiple outlet manifolds 232. Fluid branches 233 can then connect each inlet manifold 230 to several outlet manifolds 232, thereby allowing fluid 150 to flow from one to the other.

Figure 15:
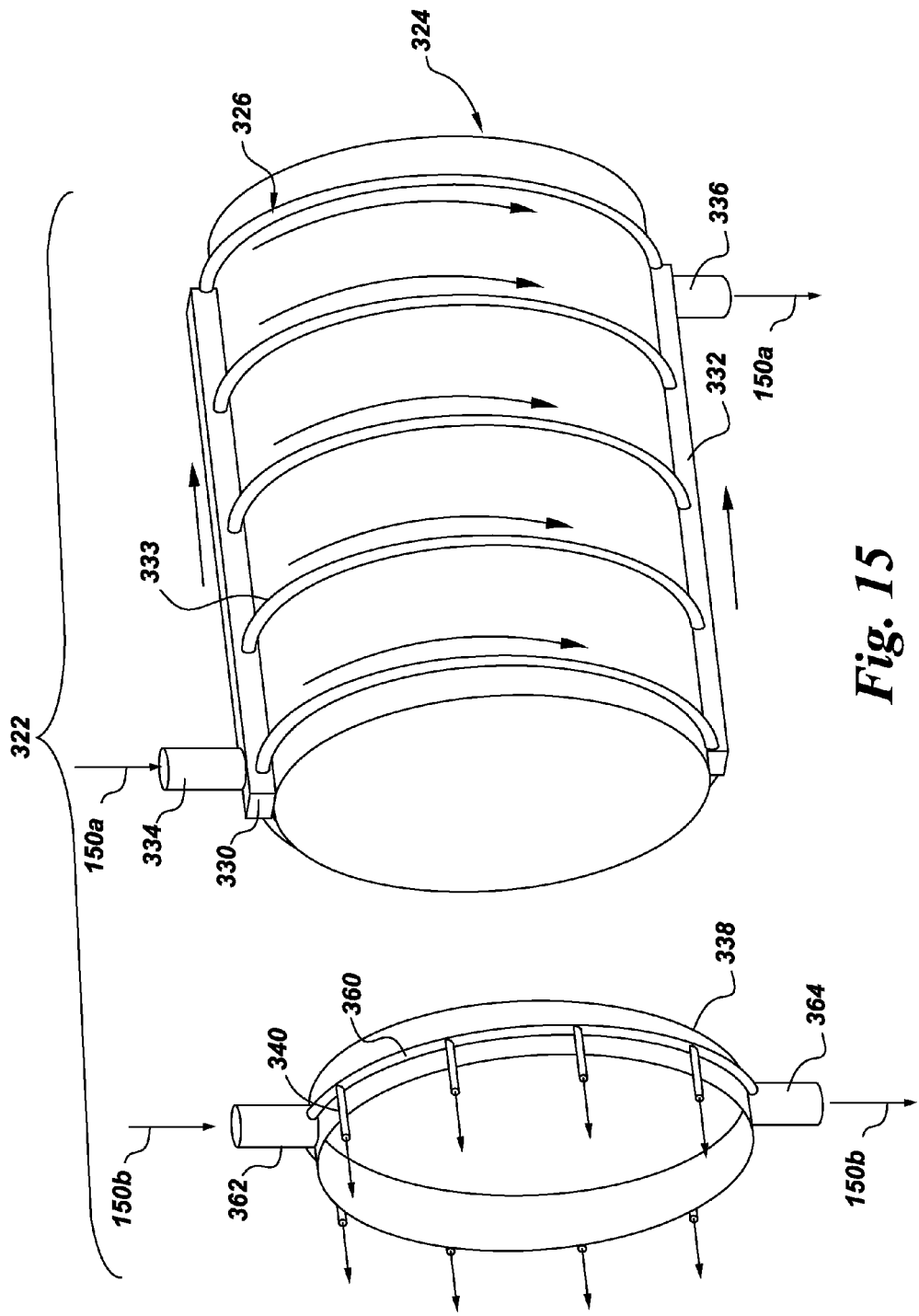
FIG. 15 is a perspective, exploded, fragmentary view of a housing configured in accordance with another example embodiment.
Figure 16:
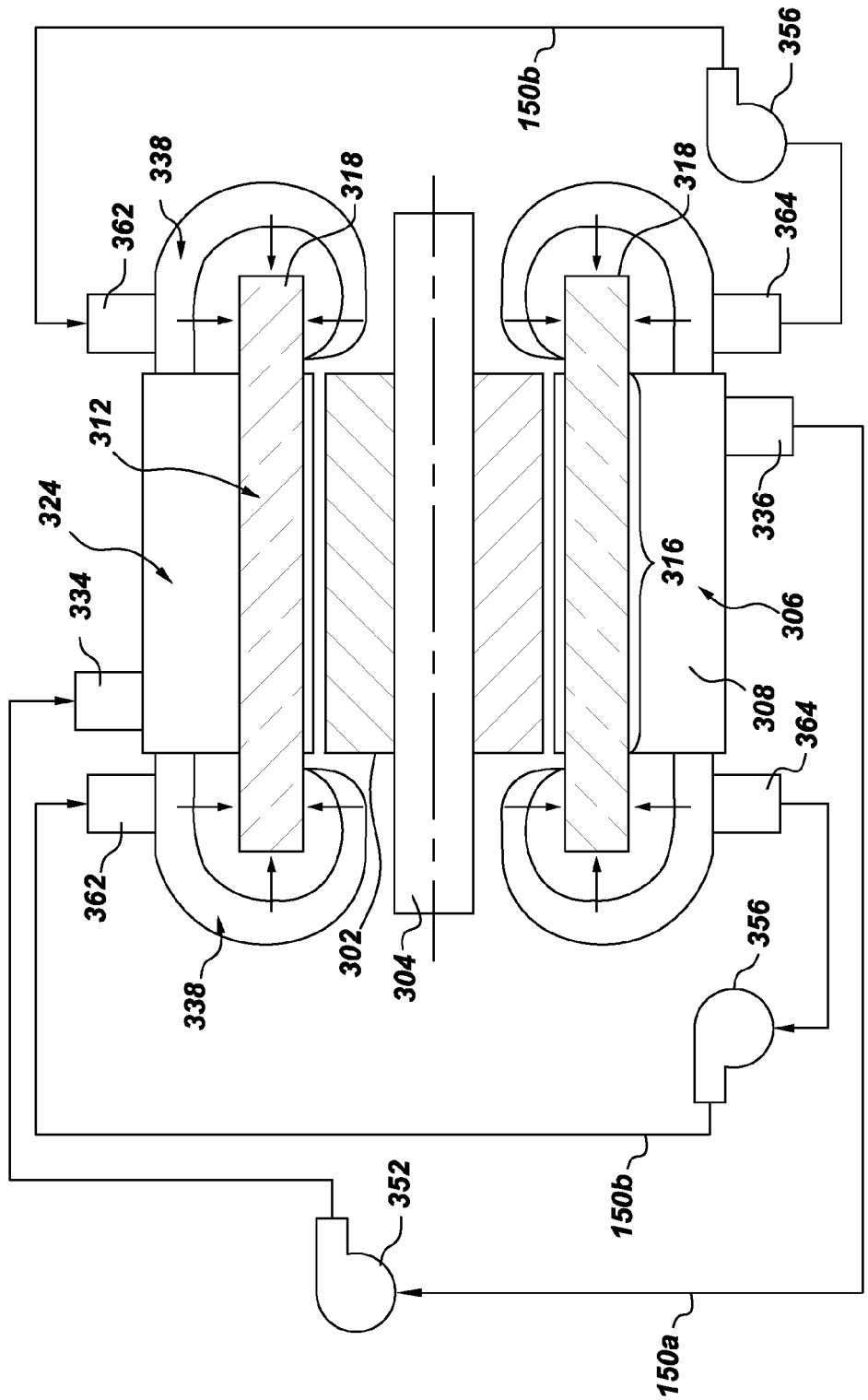
FIG. 16 is a cross sectional view of an electric machine including the housing of FIG. 15.

Referring to FIGS. 15 and 16, in another embodiment, a housing 322 may include a main housing portion 324 that surrounds the body portion 308 of a stator region 306 (and the axial portion 316 of conductive windings 312) and end housing portions 338 that enclose the end portions 318 of the conductive windings 312, and separate fluids 150*a* and 150*b* may respectively circulate through the main housing portion and the end housing portions. Specifically, the main housing portion 324 may define a main fluid channel 326, and one fluid 150*a* can enter the main fluid channel via the fluid inlet 334, passing into the inlet manifold 330. The fluid 150*a* can then pass through a branch 333 to the outlet manifold 332 and the fluid outlet 336. A pump 352 can urge the fluid 150*a* from the outlet 336 back to the inlet 334. A second cooling fluid 150*b* can enter one or both of the housing end portions 338 at respective fluid inlets 362. The housing end portions 338 can define end housing manifolds 360 to which end fluid channels 340 can connect, and the fluid 150*b* can pass from the inlet 362 to the manifold 360 and on through the end fluid channels 340. Thereafter, the fluid 150*b* can be expelled from ports into the housing end portion 338, where the fluid flows along the housing end portion to outlet 364. A pump 356 can act to urge the cooling fluid 150*b* from the fluid outlet 364 back to the fluid inlet 362.

By precluding fluid communication between the main fluid channel 326 and the housing end portion 338, two different fluids can be used to cool the axial 316 and end portions 318 of the windings 312. For example, the cooling fluid 150*a* can be electrically insulated from the conductive windings 312 and other current carrying components of the associated electric machine, allowing either a conductive fluid or a dielectric fluid to be used.

As mentioned above, during operation of the electric machine 100 (FIG. 1), the shaft 104 rotates, as does the rotor section 102 and magnets 120. Consequently, the magnetic field experienced by each of the windings 112 varies, thereby inducing electric current therein. Due to resistive losses, the current in the windings 112 causes a production of thermal energy.

Applicants have discovered that thermal energy due to resistive losses is not uniformly produced throughout the extent of the windings 112. Rather, Applicants have found that, depending on the geometry of the windings 112, as much as 50% of the total thermal energy may be generated in the winding end portions 118, and that in some applications (as where the power density is relatively high) targeted cooling of the winding end portions may be required. Embodiments configured in accordance with the above description may provide such targeted cooling. Additionally, the manifold/parallel fluid path configuration may provide enhanced thermal energy transfer through relatively larger surface areas, as well as a relatively modest pressure drop for coolant flow through the fluid network. Applicants note that the configuration of the fluid network (e.g., the geometry of the manifolds, the number and spacing of fluid paths, etc.) and the cooling fluid flow rate and can be optimized based on the size and loss characteristics of a particular electric machine (e.g., smaller and more numerous fluid paths may facilitate heat transfer at the cost of added complexity).

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed:
1. An apparatus comprising:
a housing including
a housing main portion configured to be disposed proximal to a body portion of a stator section of an electric machine, said housing main portion defining a main fluid channel that is configured to conduct fluid therethrough; and
a housing end portion that receives fluid from said main fluid channel and directs fluid into contact with a winding end portion of a conductive winding of the stator section, said housing end portion defining a plurality of end fluid channels that are in fluid communication with said main fluid channel,
wherein said housing end portion is configured for enclosing a winding end portion of the stator section, wherein said main fluid channel and said plurality of end fluid channels form a fluid network.

2. The apparatus of claim 1, wherein said housing main portion fits around and is radially exterior to the stator section.

3. The apparatus of claim 1, wherein said main fluid channel includes an inlet manifold and an outlet manifold connected together by at least two parallel fluid paths that respectively extend along opposing sides of said housing main portion.

4. The apparatus of claim 1, wherein said housing main portion and said housing end portion are configured to conduct fluid therethrough while maintaining separation between the fluid and a bore defined by the stator section.

5. The apparatus of claim 1, wherein said end fluid channel defines a port, said housing end portion further defining a barrier structure configured to inhibit liquid movement from an area inside said housing end portion to an area outside said housing end portion.

6. The apparatus of claim 5, wherein said barrier structure is configured to be disposed in close proximity to the body portion of the stator section.

7. The apparatus of claim 5, wherein said port is configured to direct fluid emanating therefrom toward a corresponding surface of said winding end portions.

8. The apparatus of claim 1, wherein said fluid network comprises a plurality of inlet and outlet manifolds extending axially along the housing main portion, a plurality of branches extending circumferentially around the housing main portion and coupled between the inlet and outlet manifolds, and a plurality of end housing manifolds defined by said housing end portion.

9. An apparatus comprising:
a rotor section;
a stator section disposed proximal to said rotor section and including;
  a body portion; and
  a conductive winding coupled to said body portion and having a winding end portion; and
a housing including
  a housing main portion disposed proximal to said body portion, said housing main portion defining a main fluid channel that is configured to conduct fluid therethrough; and
  a housing end portion that receives fluid from said main fluid channel and directs fluid into contact with said winding end portion, said housing end portion defining a plurality of end fluid channels that are in fluid communication with said main fluid channel,
  wherein said housing end portion is configured for enclosing a winding end portion of the stator section, wherein said main fluid channel and said plurality of end fluid channels form a fluid network.

10. The apparatus of claim 9, wherein said housing main portion fits around and is radially exterior to said stator section.

11. The apparatus of claim 9, wherein said main fluid channel includes an inlet manifold and an outlet manifold connected together by at least two parallel fluid paths that respectively extend along opposing sides of said housing main portion.

12. The apparatus of claim 9, wherein said stator section is substantially annular and defines a bore, and wherein said rotor section is disposed within said bore, and wherein said housing main portion and said housing end portion are configured to conduct fluid therethrough while maintaining separation between the fluid and said bore.

13. The apparatus of claim 9, wherein said end fluid channel defines a port, said housing end portion further defining a barrier structure configured to inhibit liquid movement from an area inside said housing end portion to an area outside said housing end portion.

14. The apparatus of claim 13, wherein said barrier structure is disposed in close proximity to said body portion.

15. The apparatus of claim 14, wherein said barrier structure is sealed to said body portion.

16. The apparatus of claim 13, wherein said port is configured to direct fluid emanating therefrom toward a corresponding surface of said winding end portions.

17. The apparatus of claim 9, wherein said fluid network comprises a plurality of inlet and outlet manifolds extending axially along the housing main portion, a plurality of branches extending circumferentially around the housing main portion and coupled between the inlet and outlet manifolds, and a plurality of end housing manifolds defined by said housing end portion.

* * * * *